United States Patent
Espie et al.

(10) Patent No.: US 11,656,612 B2
(45) Date of Patent: *May 23, 2023

(54) METHOD AND APPARATUS FOR MANAGING INDUSTRIAL GAS PRODUCTION

(71) Applicant: Air Products and Chemicals, Inc., Allentown, PA (US)

(72) Inventors: David M. Espie, Lansdale, PA (US); Pratik Misra, Breinigsville, PA (US); Graeme Richard Wilson, Surrey (GB)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/378,891

(22) Filed: Jul. 19, 2021

(65) Prior Publication Data

US 2023/0012835 A1 Jan. 19, 2023

(51) Int. Cl.
*G05B 19/418* (2006.01)

(52) U.S. Cl.
CPC .............. *G05B 19/41865* (2013.01); *G05B 2219/45076* (2013.01)

(58) Field of Classification Search
None
See application file for complete search history.

(56) References Cited

U.S. PATENT DOCUMENTS 5,743,715 A 4/1998 Staroselsky et al.
5,817,157 A * 10/1998 Checketts .............. C01B 3/08
48/65

(Continued)

FOREIGN PATENT DOCUMENTS

CN 108599245 A 9/2018
CN 211040479 U 7/2020

(Continued)

OTHER PUBLICATIONS

"K-GreeN-Digital-Solutions", Kellogg, Brown & Root LLC; Jan. 2021, 17 pgs.

(Continued)

*Primary Examiner* — Jason Lin
(74) *Attorney, Agent, or Firm* — Matthew Richard Weaver

(57) ABSTRACT

A method of controlling an industrial gas production facility comprising: receiving time-dependent power data receiving time-dependent operational characteristic data; defining one or more power constraints for the operational parameters of the power network; defining one or more process constraints for the operational parameters of each industrial gas plant; generating, based on the power data, the operational characteristic data, the one or more power constraints and the one or more process constraints, control set point values for the one or more industrial gas plants to achieve a pre-determined production parameter for the industrial gas production facility; and sending the control set point values to a control system to control the one or more industrial gas plants by adjusting one or more control set points of the industrial gas plants to achieve the pre-determined production parameter for the industrial gas production facility.

20 Claims, 5 Drawing Sheets

(56) References Cited

U.S. PATENT DOCUMENTS

| | | | | |
|---|---|---|---|---|
| 7,040,544 B2* | 5/2006 | Guyer | ................ | F24D 5/02 |
| | | | | 60/39.01 |
| 7,444,189 B1* | 10/2008 | Marhoefer | ............. | H02J 3/386 |
| | | | | 700/291 |
| 7,860,808 B2* | 12/2010 | Peters | ................ | G06Q 99/00 |
| | | | | 180/2.2 |
| 8,494,685 B2* | 7/2013 | Shaffer | ................ | G06F 9/50 |
| | | | | 705/412 |
| 9,292,012 B2* | 3/2016 | Sayyarrodsari | ........ | G05B 17/02 |
| 10,132,271 B2* | 11/2018 | Curtis | ................ | G06Q 50/06 |
| 10,326,658 B2* | 6/2019 | Chen | ................ | H04L 12/2803 |
| 2007/0179672 A1* | 8/2007 | Fairlie | ................ | H01M 8/0612 |
| | | | | 700/266 |
| 2010/0114395 A1* | 5/2010 | Hinatsu | ................ | C25B 1/04 |
| | | | | 700/295 |
| 2013/0177393 A1 | 7/2013 | Sishtla | | |
| 2014/0079593 A1* | 3/2014 | Naito | ................ | B01J 19/087 |
| | | | | 422/111 |
| 2016/0258361 A1* | 9/2016 | Tiwari | ................ | G06Q 10/04 |
| 2017/0122129 A1 | 5/2017 | Heid et al. | | |
| 2017/0145915 A1 | 5/2017 | Heid et al. | | |
| 2017/0317502 A1 | 11/2017 | Ito | | |

FOREIGN PATENT DOCUMENTS

| | | |
|---|---|---|
| CN | 112086960 A | 12/2020 |
| JP | 2018207728 A | 12/2018 |
| WO | 2016170700 A1 | 10/2016 |

OTHER PUBLICATIONS

K/Bidi Fabrice et al; "Power Management of a Hybrid Micro-Grid with Photovoltaic Production and Hydrogen Storage"; vol. 14, No. 6, Mar. 15, 2021; p. 1628.

* cited by examiner

METHOD AND APPARATUS FOR MANAGING INDUSTRIAL GAS PRODUCTION

TECHNICAL FIELD

The present invention relates to a method and system for optimizing production of one or more industrial gases in an industrial gas production complex. More particularly, the present invention relates to a method for maximizing industrial gas production utilizing a variable input power resource such as a renewable power source.

BACKGROUND

An industrial gas plant complex may comprise one or more process plants which produce, or are involved in the production of, gases. In non-limiting examples, these gases may comprise: industrial gases, commercial gases, medical gases, inorganic gases, organic gases, fuel gases and green fuel gases either in gaseous, liquified or compressed form.

There is considerable interest in methods and systems for utilising renewable energy sources for powering industrial gas plants and industrial gas plant complexes. However, a significant drawback of the use of renewable energy sources such as wind, solar and tidal power is the natural variability and transient nature of such energy sources.

In general, a constant or substantially constant power supply is preferred for an industrial gas plant or industrial gas plant complex. Therefore, the variable and intermittent nature of wind, solar and/or tidal power is problematic and renders it difficult to ensure maximum utilisation of an industrial gas plant or industrial gas plant complex utilizing such power sources. Thus solutions to these technical problems are required to enable industrial gases to be produced efficiently in such arrangements.

One such industrial gas is Ammonia. Ammonia is produced using Hydrogen from water electrolysis and nitrogen separated from the air. These gases are then fed into the Haber-Bosch process, where Hydrogen and Nitrogen are reacted together at high temperatures and pressures to produce ammonia.

There is considerable interest in the production of Ammonia using renewable energy. This is known as green Ammonia. However, Ammonia synthesis can be particularly sensitive to the variation in input energy from renewable sources.

Therefore, there exists a need in the art to provide more effective control methods and arrangements to address these issues.

BRIEF SUMMARY OF THE INVENTION

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

According to a first aspect, there is provided a method of controlling an industrial gas production facility comprising one or more industrial gas plants powered by a power network including one or more renewable power sources, the method being executed by at least one hardware processor, the method comprising: receiving time-dependent power data representative of one or more operational parameters of the power network; receiving time-dependent operational characteristic data representative of one or more operational parameters of the one or more industrial gas plants; defining one or more power constraints for the operational parameters of the power network; defining one or more process constraints for the operational parameters of each industrial gas plant; generating, based on the power data, the operational characteristic data, the one or more power constraints and the one or more process constraints, control set point values for the one or more industrial gas plants to achieve a pre-determined production parameter for the industrial gas production facility; and sending the control set point values to a control system to control the one or more industrial gas plants by adjusting one or more control set points of the industrial gas plants to achieve the pre-determined production parameter for the industrial gas production facility.

In embodiments, the step of generating further comprises utilizing a model-based controller.

In embodiments, the model-based controller utilizes model predictive control.

In embodiments, the model predictive control-based controller comprises one or more computational models representative of each of the one or more industrial gas plants and the power network.

In embodiments, the step of generating further comprises: utilizing the model predictive control-based controller to generate a set of manipulated variables for the one or more computational models; and generating, from the set of manipulated variables, the control set point values.

In embodiments, the model predictive control-based controller is operable to generate a plurality of control set point values for the one or more control set points for a predetermined future time horizon.

In embodiments, the model predictive control-based controller is operable to generate a time series of control set point values for the one or more control set points for a predetermined future time horizon.

In embodiments, the model predictive control-based controller is operable to generate a time series of control set point values for the one or more control set points spaced over predetermined time intervals within the predetermined future time horizon.

In embodiments, the predetermined future horizon is defined at least in part by the rate of change of one or more parameters of one or more industrial gas plants.

In embodiments, the industrial gas production facility further comprises one or more energy storage resources, and wherein the step of receiving time-dependent power data further comprises receiving time-dependent operational characteristic data representative of one or more operational parameters of the energy storage resources.

In embodiments, the step of generating further comprises generating control set point values for the one or more energy storage resources.

In embodiments, the one or more energy storage resources comprise one or more of: a battery energy storage system; a compressed air energy storage system; and a liquid air energy storage system.

In embodiments, the one or more power constraints for the operational parameters of the energy storage resource comprises one or more of: the maximum charging rate from the power network; the maximum discharge rate; maximum energy capacity; and minimum energy capacity.

In embodiments, the time-dependent power data representative of one or more operational parameters of the power network comprises real-time power data.

In embodiments, the time-dependent power data comprises data regarding the output of the one or more renewable power sources.

In embodiments, the time-dependent power data comprises data regarding the output of one or more of: a wind power source; a solar power source; and a tidal power source.

In embodiments, the time-dependent power data may comprise one or more of: available wind power; available solar power; total available power; and power load.

In embodiments, the time-dependent power data comprises data regarding the power input and/or power utilization rates of the one or more energy storage resources.

In embodiments, the time-dependent power data comprises data regarding the power input and/or power utilization rates of the one or more energy storage resources.

In embodiments, the time-dependent power data comprises battery capacity levels and/or available energy.

In embodiments, the manipulated variables for the one or more energy storage resources comprise charging and discharging rates.

In embodiments, the one or more power constraints for the operational parameters of the power network comprises the maximum power draw from the power network.

In embodiments, the industrial gas production facility further comprises one or more industrial gas storage resources, and wherein the step of receiving time-dependent operational characteristic data further comprises receiving time-dependent operational characteristic data representative of one or more operational parameters of the industrial gas storage resources.

In embodiments, the step of generating further comprises generating control set point values for the one or more industrial gas storage resources.

In embodiments, the time-dependent operational characteristic data representative of one or more operational parameters of the one or more industrial gas plants comprises real-time operational characteristic data.

In embodiments, time-dependent operational characteristic data representative of one or more operational parameters of the industrial gas storage resources comprises one or more of: storage pressure; storage volume; charging rate; and discharging rate.

In embodiments, the one or more process constraints for the operational parameters of each industrial gas plant comprise one or more of: maximum ramp rates; minimum ramp rates; maximum production capacity; minimum production capacity.

In embodiments, the industrial gas production facility comprises an Ammonia production facility.

In embodiments, the industrial gas plants of the Ammonia production plant comprise a Hydrogen production plant; a Nitrogen production plant; and an Ammonia production plant.

In embodiments, the pre-determined production parameter for the Ammonia production plant comprises Ammonia production rate.

In embodiments, the pre-determined production parameter for the Ammonia production plant defines a maximum Ammonia production rate for a given power availability.

According to a second aspect, there is provided a system for controlling an industrial gas production facility comprising one or more industrial gas plants powered by a power network including one or more renewable power sources, the system comprising: at least one hardware processor operable to perform the steps of: receiving time-dependent power data representative of one or more operational parameters of the power network; receiving time-dependent operational characteristic data representative of one or more operational parameters of the one or more industrial gas plants; defining one or more power constraints for the operational parameters of the power network; defining one or more process constraints for the operational parameters of each industrial gas plant; generating, based on the power data, the operational characteristic data, the one or more power constraints and the one or more process constraints, control set point values for the one or more industrial gas plants to achieve a pre-determined production parameter for the industrial gas production facility; and sending the control set point values to a control system to control the one or more industrial gas plants by adjusting one or more control set points of the industrial gas plants to achieve the pre-determined production parameter for the industrial gas production facility.

In embodiments, the step of generating further comprises utilizing a model-based controller.

In embodiments, the model-based controller utilizes model predictive control.

In embodiments, the model predictive control-based controller comprises one or more computational models representative of each of the one or more industrial gas plants and the power network.

In embodiments, the step of generating further comprises: utilizing the model predictive control-based controller to generate a set of manipulated variables for the one or more computational models; and generating, from the set of manipulated variables, the control set point values.

In embodiments, the model predictive control-based controller is operable to generate a plurality of control set point values for the one or more control set points for a predetermined future time horizon.

In embodiments, the model predictive control-based controller is operable to generate a time series of control set point values for the one or more control set points for a predetermined future time horizon.

In embodiments, the model predictive control-based controller is operable to generate a time series of control set point values for the one or more control set points spaced over predetermined time intervals within the predetermined future time horizon.

In embodiments, the predetermined future horizon is defined at least in part by the rate of change of one or more parameters of one or more industrial gas plants.

In embodiments, the industrial gas production facility further comprises one or more energy storage resources, and wherein the step of receiving time-dependent power data further comprises receiving time-dependent operational characteristic data representative of one or more operational parameters of the energy storage resources.

In embodiments, the step of generating further comprises generating control set point values for the one or more energy storage resources.

In embodiments, the one or more energy storage resources comprise one or more of: a battery energy storage system; a compressed air energy storage system; and a liquid air energy storage system.

In embodiments, the one or more power constraints for the operational parameters of the energy storage resource comprises one or more of: the maximum charging rate from the power network; the maximum discharge rate; maximum energy capacity; and minimum energy capacity.

In embodiments, the time-dependent power data representative of one or more operational parameters of the power network comprises real-time power data.

In embodiments, the time-dependent power data comprises data regarding the output of the one or more renewable power sources.

In embodiments, the time-dependent power data comprises data regarding the output of one or more of: a wind power source; a solar power source; and a tidal power source.

In embodiments, the time-dependent power data may comprise one or more of: available wind power; available solar power; total available power; and power load.

In embodiments, the time-dependent power data comprises data regarding the power input and/or power utilization rates of the one or more energy storage resources.

In embodiments, the time-dependent power data comprises data regarding the power input and/or power utilization rates of the one or more energy storage resources.

In embodiments, the time-dependent power data comprises battery capacity levels and/or available energy.

In embodiments, the manipulated variables for the one or more energy storage resources comprise charging and discharging rates.

In embodiments, the one or more power constraints for the operational parameters of the power network comprises the maximum power draw from the power network.

In embodiments, the industrial gas production facility further comprises one or more industrial gas storage resources, and wherein the step of receiving time-dependent operational characteristic data further comprises receiving time-dependent operational characteristic data representative of one or more operational parameters of the industrial gas storage resources.

In embodiments, the time-dependent operational characteristic data representative of one or more operational parameters of the one or more industrial gas plants comprises real-time operational characteristic data.

In embodiments, time-dependent operational characteristic data representative of one or more operational parameters of the industrial gas storage resources comprises one or more of: storage pressure; storage volume; charging rate; and discharging rate.

In embodiments, the one or more process constraints for the operational parameters of each industrial gas plant comprise one or more of: maximum ramp rates; minimum ramp rates; maximum production capacity; minimum production capacity.

In embodiments, the industrial gas production facility comprises an Ammonia production facility.

In embodiments, the industrial gas plants of the Ammonia production plant comprise a Hydrogen production plant; a Nitrogen production plant; and an Ammonia production plant.

In embodiments, the pre-determined production parameter for the Ammonia production plant comprises Ammonia production rate.

In embodiments, the pre-determined production parameter for the Ammonia production plant defines a maximum Ammonia production rate for a given power availability.

According to a third aspect, there is provided a computer readable storage medium storing a program of instructions executable by a machine to perform a method of controlling an industrial gas production facility comprising one or more industrial gas plants powered by a power network including one or more renewable power sources, the method being executed by at least one hardware processor, the method comprising: receiving time-dependent power data representative of one or more operational parameters of the power network; receiving time-dependent operational characteristic data representative of one or more operational parameters of the one or more industrial gas plants; defining one or more power constraints for the operational parameters of the power network; defining one or more process constraints for the operational parameters of each industrial gas plant; generating, based on the power data, the operational characteristic data, the one or more power constraints and the one or more process constraints, control set point values for the one or more industrial gas plants to achieve a pre-determined production parameter for the industrial gas production facility; and sending the control set point values to a control system to control the one or more industrial gas plants by adjusting one or more control set points of the industrial gas plants to achieve the pre-determined production parameter for the industrial gas production facility.

BRIEF DESCRIPTION OF THE DRAWINGS

Embodiments of the present invention will now be described by example only and with reference to the figures in which.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Figure 1:
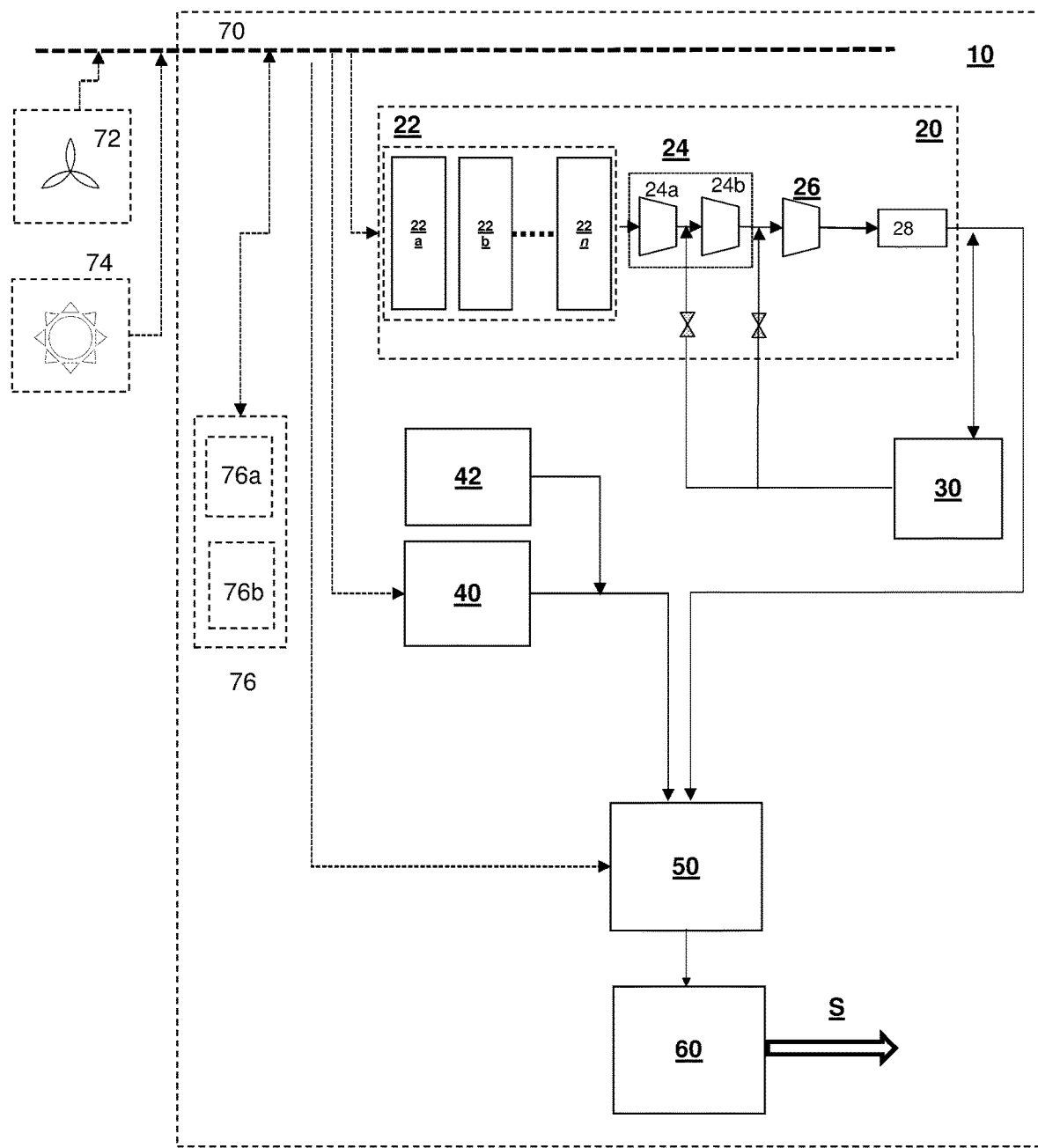
FIG. 1 is a schematic diagram of an industrial gas plant complex.

FIG. 1 shows a schematic diagram of an exemplary industrial gas plant complex 10. In embodiments, the industrial gas plant complex comprises an Ammonia plant complex 10.

The Industrial gas plant complex 10 comprises a Hydrogen production plant 20, a Hydrogen storage unit 30, an Air Separation Unit (ASU) 40, an Ammonia synthesis plant 50 and an ammonia storage unit 60. The ammonia storage unit 60 is connected to an external supply chain S for onward distribution of Ammonia.

Electricity for powering the Industrial gas plant complex 10 is provided by a main bus 70 supplied by a local power grid (not shown). Power for the industrial gas plant complex 10 is generated at least in part by renewable energy sources such as wind 72 (via a suitable wind farm comprising a plurality of wind turbines) and/or solar energy 74 (via a solar farm comprising a plurality of solar cells) although other sources such as a diesel-, petrol- or hydrogen-powered generator (not shown) may optionally be utilised.

To address the intermittency of power supply from renewable sources, an energy storage resource 76 is provided. The energy storage resource 76 may comprise one or more energy storage devices. In embodiments, the energy storage resource 76 forms part of the industrial gas plant complex 10 and is controlled and managed thereby as will be described below.

The energy storage resource 76 may take any suitable form. In embodiments, the energy storage devices may comprise one or more of: a Battery Energy Storage System (BESS) 76a or a Compressed/Liquid Air Energy Systems (CAES or LAES) 76b.

A BESS 76a utilises electrochemical techniques and may comprise one or more of: Lithium Ion batteries, Lead acid batteries, Zinc Bromine, Sodium Sulphur or Redox Flow batteries. Electro-chemical arrangements such as batteries have advantages in terms of fast charging rates and fast (virtually instantaneous) ramp rates to supply power to cope with a sudden drop in energy supply. However, such devices tend to be of more limited power capacity than other systems. Therefore, they may be better suited for use in situations where, for example, a power shortfall from renewable sources is expected to be temporary or short in duration.

A CAES 76b compresses air and stores the air under a high pressure of around 70 bar. It is usually stored in an underground cavern. When power is required, the compressed air is heated and expanded in an expansion turbine in order to drive a generator.

A LAES 76b comprises an air liquefier to draw air from the environment and compress and cool the air to achieve liquefaction. The liquified air is then stored in an insulated tank until power is required. To convert the liquified air into useable energy, the liquid air is pumped to high pressure and heated through heat exchangers. The resulting high-pressure gas is used to drive a turbine to generate electricity.

CAES and LAES are capable of storing significantly more energy than most BESS 76a systems. However, CAES and LAES have slower ramp rates than electro-chemical storage devices and require longer to store larger quantities of energy. For example, it may take of the order of 5-10 minutes for a compression stage to operate under full load, and 10-20 minutes to generate full power on demand. Such storage devices are therefore more appropriate for longer-term storage and for supplying power during long periods of renewable energy shortfall.

Whilst all these elements are shown in FIG. 1, this is for illustrative purposes only. The energy storage resource 76 need not comprise each and every described element and may comprise only one or more of the described elements. In addition, the energy resource 76 may comprise additional elements.

Elements 72, 74, 76 feed into the main bus 70 as shown by the arrows in FIG. 1. Element 76 is operable to supply power to the main bus 70 when demand requires it, and to store energy from the main bus 70 when demand is low. In other words, the energy storage resource 76 acts to smooth the power delivery to the network in view of the variability of renewable energy sources such as wind 72 and solar 74. This may be controlled and optimized as discussed below.

Whilst the above examples of renewable power have been given with regard to wind and solar power, this is not intended to be limiting. For example, other renewable energy sources may be used such as hydro-electric (not shown) and/or tidal power (not shown).

The industrial gas production components of the Industrial gas plant complex 10 will now be described in detail.

Hydrogen Production Plant 20

The Hydrogen production plant 20 is operable to electrolyse water to form Hydrogen and Oxygen. Any suitable source of water may be used. However, in embodiments in which sea water is used to produce the water for the electrolysis, the apparatus would further comprise at least one desalination and demineralisation plant for processing the sea water.

The Hydrogen production plant 20 comprises a plurality of electrolysis units 22a, 22b . . . 22n or electrolysis cells. Each unit or cell may be referred to as an "electrolyser" 22a, 22b . . . 22n. Any number of electrolysers may be provided. In embodiments, around 100 may be provided. The electrolysers may enable the Hydrogen production plant 20 to have a total capacity of at least 1 GW. In embodiments, the capacity may be in excess of 2 GW; for example, 2.2 GW. However, the ultimate capacity of the Hydrogen production plant 20 is limited only by practical considerations such as power supply.

Any suitable type of electrolyser may be used. In embodiments, the plurality of electrolysers usually consists of a multiplicity of individual cells combined into "modules" that also include process equipment such as pumps, coolers, and/or separators. Hundreds of cells may be used and may be grouped in separate buildings. Each module typically has a maximum capacity greater than 10 MW, although this is not intended to be limiting.

Any suitable type of electrolyser may be used with the present invention. Generally, three conventional types of electrolyser are utilized—alkaline electrolysers; PEM electrolysers; and solid oxide electrolysers. Any of these types may be used with the present invention.

Alkaline electrolysers transport hydroxide ions ($OH^-$) through the electrolyte from the cathode to the anode with hydrogen being generated on the cathode side. Commonly, a liquid alkaline solution of sodium hydroxide or potassium hydroxide is used as the electrolyte.

A PEM electrolyser utilizes a solid plastics material as an electrolyte, and water reacts at an anode to form oxygen and positively charged hydrogen ions. The electrons flow through an external circuit and the hydrogen ions selectively move across the PEM to the cathode. At the cathode, hydrogen ions combine with electrons from the external circuit to form hydrogen gas.

Solid oxide electrolysers use a solid ceramic material as the electrolyte that selectively conducts negatively charged oxygen ions ($O^{2-}$) at elevated temperatures. Water at the cathode combines with electrons from the external circuit to form hydrogen gas and negatively charged oxygen ions. The oxygen ions pass through the solid ceramic membrane and react at the anode to form oxygen gas and generate electrons for the external circuit.

The electrolysers may be arranged in any suitable group. For example, they may be arranged in parallel.

Hydrogen is produced at about atmospheric pressure by the Hydrogen production plant 20. A stream of hydrogen so generated is removed from the electrolysers at a slightly elevated pressure.

In embodiments, the Hydrogen production plant 20 further comprises Hydrogen compression and purification stages.

In embodiments, the compression stage comprises a multistage compression system having two sections 24, 26. The first section 24 comprises a low pressure (LP) section in which Hydrogen gas is compressed from a first feed pressure from the electrolysers to a second intermediate pressure greater than the first feed pressure.

The second section comprises a medium pressure (MP) section 26 in which the Hydrogen gas is compressed from the second intermediate pressure to a third final pressure greater than the second pressure. The third pressure is selected as required for any downstream process(es).

In the non-limiting embodiment shown in FIG. 1, the first (LP) section 24 has two compressor stages 24a, 24b. However, any suitable number may be used. For example, the LP section 24 may have a single compressor or may have a plurality of compressors.

As shown in the non-limiting embodiment of FIG. 1, the second (MP) section 26 has a single stage of compression (i.e. a single compressor). However, any suitable number of stages may be provided as required.

The compressors forming part of the first (LP) 24 and second (MP) 26 compression sections may take any suitable form. The person skilled in the art would readily be aware of the form, number and capacity of these compressors. For example, for a total electrolyser capacity of 1 GW, 2 to 4 compressors would typically be required. 5 or more may be required for total electrolyser capacity of 2 GW.

In the embodiment of FIG. 1, a purification section 28 is provided. The purification section 28 may be required where, for example, any downstream processes require higher purity Hydrogen (i.e. with reduced levels of water and/or oxygen inherently present in the compressed Hydrogen gas produced by the electrolysis). However, this need not be the case and this section may be omitted if not required.

If provided, the purification section 28 comprises a "DeOxo" unit operable to remove oxygen. The DeOxo unit operates through the catalytic combustion of Hydrogen to produce water compressed Hydrogen gas from which Oxygen has been removed.

The purification section 28 may further comprise a drier. In this embodiment, the drier comprises a temperature swing adsorption (TSA) unit to produce dry compressed hydrogen gas for the downstream process(es). However, other suitable drier and/or adsorption technologies may be used here. In embodiments, the drier is downstream of the DeOxo unit.

A downstream processing unit may be any unit that utilises Hydrogen gas as a feedstock. In embodiments, the downstream processing unit is or includes an Ammonia synthesis plant.

Hydrogen Storage Unit 30

Any Hydrogen surplus to requirements may be stored in the Hydrogen storage unit 30. The storage unit 30 may comprise of a plurality of short-term and longer-term storage options with different sizes, filling/discharge rates, and roundtrip efficiencies.

Typical storage system could include pressure vessels and/or pipe segments connected to a common inlet/outlet header. The pressure vessels may be spheres, for example, to about 25 m in diameter, or "bullets" which are horizontal vessels with large L/D ratios (typically up to about 12:1) with diameters up to about 12 m. In certain geographies, underground caverns may be included as storage systems to flatten out the seasonal variations associated with the renewable power.

In the context of the present embodiments, stored Hydrogen may be used as a reservoir for Ammonia Synthesis plant 50.

Air Separation Unit 40

In non-limiting embodiments, the Nitrogen gas required for Ammonia production is produced by cryogenic distillation of air in the air separation unit (ASU) 40. Typically an ASU 40 has various stages operating at different pressures. For example, a high pressure (HP) Column operates at around 10.5 bar g and a low pressure (LP) Column operates at around 5 bar g. Gaseous Nitrogen is produced by the ASU 40 at pressures in excess of 25 bar g. The pressure is then reduced to provide a stream of Nitrogen gas in one or more pipes arranged to transport Nitrogen to the Ammonia Synthesis plant 40. However, other Nitrogen sources may be used if required, for example, Liquid Nitrogen storage 42.

Liquid Nitrogen storage unit 42 may comprise any suitable Liquid Nitrogen Storage, Vaporisation and Distribution (LIN SVD) arrangement. The storage unit 42 may comprise a plurality of short-term and longer-term storage options having different sizes, filling/discharge rates, and roundtrip efficiencies.

A typical storage system for Liquid Nitrogen may comprise a plurality of pressure vessels and/or pipe segments connected to a common inlet/outlet header. The pressure vessels may comprise low pressure flat bottom storage tanks (FBTs). Additionally or alternatively, the pressure vessels may be spheres, for example, to about 25 m in diameter, or "bullets" which are horizontal vessels with large L/D ratios (typically up to about 12:1) with diameters up to about 12 m.

Preferably, the Nitrogen gas produced by the ASU 40 is compressed by a compressor and cooled to be stored in the Nitrogen storage unit 40 in liquid form. However, gaseous Nitrogen storage may also be provided. The storage unit 40 may be used as a reservoir for Ammonia synthesis plant 50 which may be fed by a connecting pipe.

Ammonia Synthesis Plant 50

The Ammonia Synthesis plant 50 operates on the Haber-Bosch process and comprises an Ammonia Loop. An Ammonia Loop is a single unit equilibrium reactive system which processes the synthesis gases of Nitrogen and Hydrogen to produce Ammonia.

Nitrogen is provided by one or more pipes from the ASU 40 (or storage 42) which, in embodiments, may run continuously to provide Nitrogen. Hydrogen is provided from one or more pipes from Hydrogen production plant 20 either directly (if it is running based on the availability of the renewable power at given instance) or from the Hydrogen storage 30.

Stoichiometric composition of synthesis gas is processed by a syn-gas compressor system (not shown) and the resulting Ammonia product is refrigerated by another set of compressors (not shown) and sent to storage 60 if required. The performance of Ammonia loop is governed by the equilibrium conversion of the exothermic reaction. The parameters for this will be discussed below.

Electricity Generation and Management

Electricity for the plant 10 as a whole is supplied by the main bus 70. This may be generated from any suitable energy source, including renewable or non-renewable energy sources.

As shown in FIG. 1, the electricity is generated from at least one renewable energy source of either wind energy 72 (via a suitable wind farm comprising a plurality of wind turbines) and/or solar energy 74 (via a solar farm comprising a plurality of solar cells). In addition, other renewable energy sources may be used such as hydro-electric (not shown) and/or tidal power (not shown).

In addition, electricity or resources for the plant 10 as a whole or for sub-plants of the plant 10 may be drawn from the energy storage resource 76. As described with respect to FIG. 1, the energy storage resource 76 may comprise one or more storage resources.

Additionally or alternatively, in non-exhaustive arrangements, the energy storage devices may comprise one or more of: a Battery Energy Storage System (BESS) 76a or a Compressed/Liquid Air Energy Systems (CAES or LAES) 76b.

These elements are used optimally to store additional resources and/or energy when electricity provision from renewable sources is high or predicted to be high and then utilise those resources and/or energy when renewable electricity resources are predicted to be low.

The available power from the main bus 70 powered by these facilities is monitored as will be described below.

Control System 100

Figure 2:
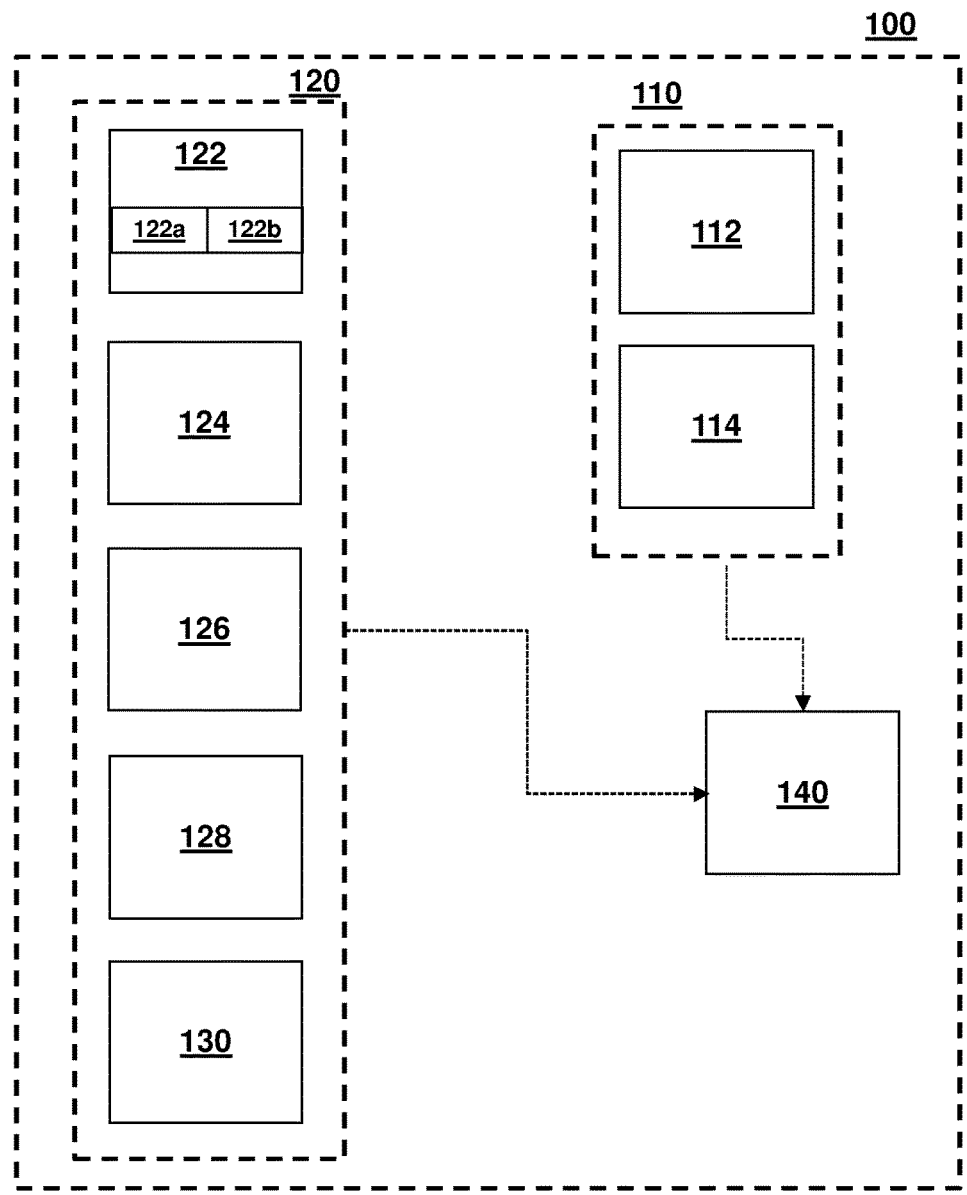
FIG. 2 is a detailed schematic diagram of a control system for controlling the industrial gas plant of FIG. 1.

The plant 10 of FIG. 1 has a control system 100 as shown in detail in the schematic of FIG. 2.

The control system 100 comprises three main categories: power control systems 110, plant control systems 120 and a master controller 140. These are non-limiting terms and do not necessarily imply any interconnection or grouping between the component parts of the systems 110, 120, 140 and are illustrated in a common grouping for clarity purposes only.

Power Control Systems 110

The power control systems 110 in the described embodiments monitor available power both in real time and also, optionally, future predicted available power. Given the inherent variability of renewable energy sources, the power control systems 110 may monitor parameters such as energy generation, energy storage from the energy storage resource 76 and load. They are also configured to send usage, power and process data to external systems as required.

The power control systems 110 may comprise a power monitor module 112 operable to monitor current available power. The power monitor module 112 will also monitor the maximum power draw from the main bus 70 which will set an upper constraint on the power which can be drawn at any one time.

The variables which may be monitored include:
Wind power WP
Solar Power SP
Power load L
Total available main bus power TP
Maximum power draw MPD In the present embodiments, these measurements are continuous and so are measured in real time. However, in other arrangements the measurements may be performed at predetermined intervals.

The power control systems 110 may further comprise an energy storage management module 114. This may provide information on the current state of the energy storage 76, for example, battery level, available power, storage capacity. The module 114 is also operable to control the energy storage 76 to store energy from the grid 70 when needed, and to provide additional power to the grid when needed.

This may be captured by a general value:
Energy storage ES
Plant Control Systems 120

Turning now to the plant complex control systems 120, these comprise a Hydrogen production plant control system 122, a Hydrogen storage control system 124, an ASU control system 126, a Nitrogen storage control system 128 and an Ammonia loop control system 130. These elements may comprise any suitable controller, for example, proportional-integral-derivative (PID) controllers.

Hydrogen Control System 122

The Hydrogen production plant control system 122 comprises controller modules for control of the various components of the Hydrogen production plant 20. An electrolyser controller 122a may be configured to monitor parameters of the electrolysers. For example, the controller 122a may monitor the power demands, output, amount and rate of generation of Hydrogen gas from the electrolysis by direct or indirect measurement utilising appropriate variables or sensors.

A measurement of output and rate of Hydrogen generation may be derived from sensor measurements such as direct flow measurements, or alternatively inferred through indirect measurements such as the electrolyser current or power demand.

Operational characteristic variables which may be measured and/or controlled by the controller 122a may comprise:
Electrolyzer Power Consumed EP
Electrolyzer Hydrogen Produced EH
Demin Water Flow ED
Average cell temperature ECT
Average cell pressure ECP
Current flowing through the electrodes I In addition, the Hydrogen production plant control system 122 comprises a compression controller 122b. The controller 122b is operable to control and measure parameters associated with each of the LP and MP compression stages 24, 26. For example, such parameters may comprise power utilisation (i.e. power consumed CP), compression volume, compressor pressure HCP, flow HCF, run time, ramp rate etc. The efficiency of the compressor system may also be tracked using the compressor power consumed, CP.

For the Hydrogen storage controller 124, the pressure and flow of compressed hydrogen from electrolyser and compression system to the storage system may be monitored, as well as the storage pressure, and pressure and flow of compressed hydrogen gas to the Ammonia Synthesis plant 50 may be monitored and controlled. This data may include maximum storage pressure and/or storage pressure ramp variables; for example, maximum and minimum constraints on rate of change, i.e. how quickly flow and/or pressure can be increased and how quickly it can be reduced.

Real-time tracking of the Hydrogen storage unit 30 may be based on measurement and control of variables such as:
Storage system pressure and temperature, SP, ST
Hydrogen compressor pressure and flow, HCP, HCF.

The above controllers 122a, 122b, 124 may comprise PID controllers operable to maintain particular set point values within the system as required.

ASU Control System 126

The ASU 40 has a controller 126 which is operable to measure and control parameters associated with the performance of the ASU 40 including power requirements, operating capacity, Nitrogen output volume and rate, and ramp up/ramp down rates for operation.

ASU Storage Control System 128

The Nitrogen storage controller 128 may also comprise measurement and prediction data relating to the Nitrogen storage 42 including, but not limited to: storage volumes, compression, capacity, discharge rates, specific power, $N_2$ recovery, and temperature differences in a heat exchanger forming part of the ASU.

Ammonia Loop Control System 130

The Ammonia Loop control system 130 comprises a controller operable to control a single unit equilibrium reactive system which processes the synthesis gases of Nitrogen and Hydrogen to produce Ammonia.

Nitrogen is provided by the ASU 40 which, in embodiments, is running continuously to provide Nitrogen, or the LIN SVD 42 as required.

Hydrogen is provided from the Hydrogen production plant 20 if it is running based on the availability of the renewable power at given instance or else hydrogen is fed from the Hydrogen storage 30.

Stoichiometric composition of synthesis gas is processed by a syn-gas compressor forming part of the Ammonia plant system and the product is refrigerated by another set of compressors and sent to storage.

The performance of the Ammonia loop is governed by the equilibrium conversion of the exothermic reaction and is monitored in real-time based on the predictive model for feed to the Ammonia loop, AF as a function various predictor variables, including:

Power consumed by Ammonia loop, AP,

Ammonia loop pressure and Temperature, ALP, ALT

Feed flow rates of nitrogen and hydrogen streams, ANF, AHF

Ammonia plant syngas compressor pressure, ACP.

Master Controller 140

In each of the cases above, the control systems 110, 120 are operable to measure and, where appropriate, control the parameters of the respective power sources and industrial gas plants and are able to output process data from each element of the complex.

This data is provided to the master controller 140 which is operable to control the plant complex 100 dynamically in response to this data.

The master controller 140 comprises, in embodiments, model predictive control. Model predictive control may, in embodiments, comprise a multivariable control algorithm that utilizes an internal dynamic model of the process plant components, an appropriate cost function, and an optimization algorithm which is operable, in embodiments, to minimize the cost function using a plurality of control inputs. Alternative functions may be used. These may involve, for example, similarity functions which are maximized.

In other words, the master controller 140 implements model predictive control (MPC) to control the plant complex 10 in response to process variables and parameters whilst satisfying a plurality of constraints as will be discussed below.

The master controller 140 is arranged to receive inputs from the control systems 110, 120 and derive a plant operation policy including set point operation parameters over a predetermined future time horizon. These are then fed to the plant complex control systems 120 to control the relevant processes controlled thereby.

In other words, the master controller 140 utilises a model predictive controller derived from a dynamic model of the operation of the process plant complex 10. In embodiments, it may utilize linear empirical models obtained by system identification of the various processes. Alternatively or additionally, it may utilize non-linear high fidelity models or non-linear models created from machine learning algorithms.

The master controller 140 utilizing MPC is operable to optimize the set points and processes for a present time period, whilst also being able to adapt for future time periods. This is achieved, in embodiments, by optimizing a finite time horizon for the processes whilst implementing the current time period. The optimization is then performed again at the next time period.

Master Controller 140 Configuration

The master controller 140 comprises an optimization algorithm operable to determine the rate at which the various industrial gas plants should run to manage the renewable Hydrogen production and storage optimally while maximizing Ammonia production for a given available power. In addition, the optimization algorithm is configured to manage and optimize the utilization of Hydrogen and Nitrogen storage, and to control and optimize the use of battery power from the energy storage resource 76. Thus, the master controller 140 enables real-time optimization of an industrial gas plant complex using renewable power.

In embodiments, the master controller 140 solves an optimization algorithm applied to a dynamic mathematical model of an industrial gas plant complex. The mathematical models may be applied to each process plant in the complex and may be empirical in nature.

In embodiments, the model for each plant may be determined empirically based on the behaviour of the plant itself. Therefore, the model is based on the individual specific behaviour of a given plant.

The variables for the model of each plant comprise manipulated variables (MV) and control (or process) variables (CV). The manipulated variables comprise parameters of the plant which can be controlled directly. The control variables, in general, relate to process outputs from the plant which are not controllable directly but are dependent upon the values of the manipulated variables.

For example, in the case of the Ammonia production plant 50, an example of manipulated variables may be the Hydrogen and Nitrogen feed flow rates to the Ammonia loop, whereas a relevant control variable may be the Ammonia output rate from the production process.

Figure 3:
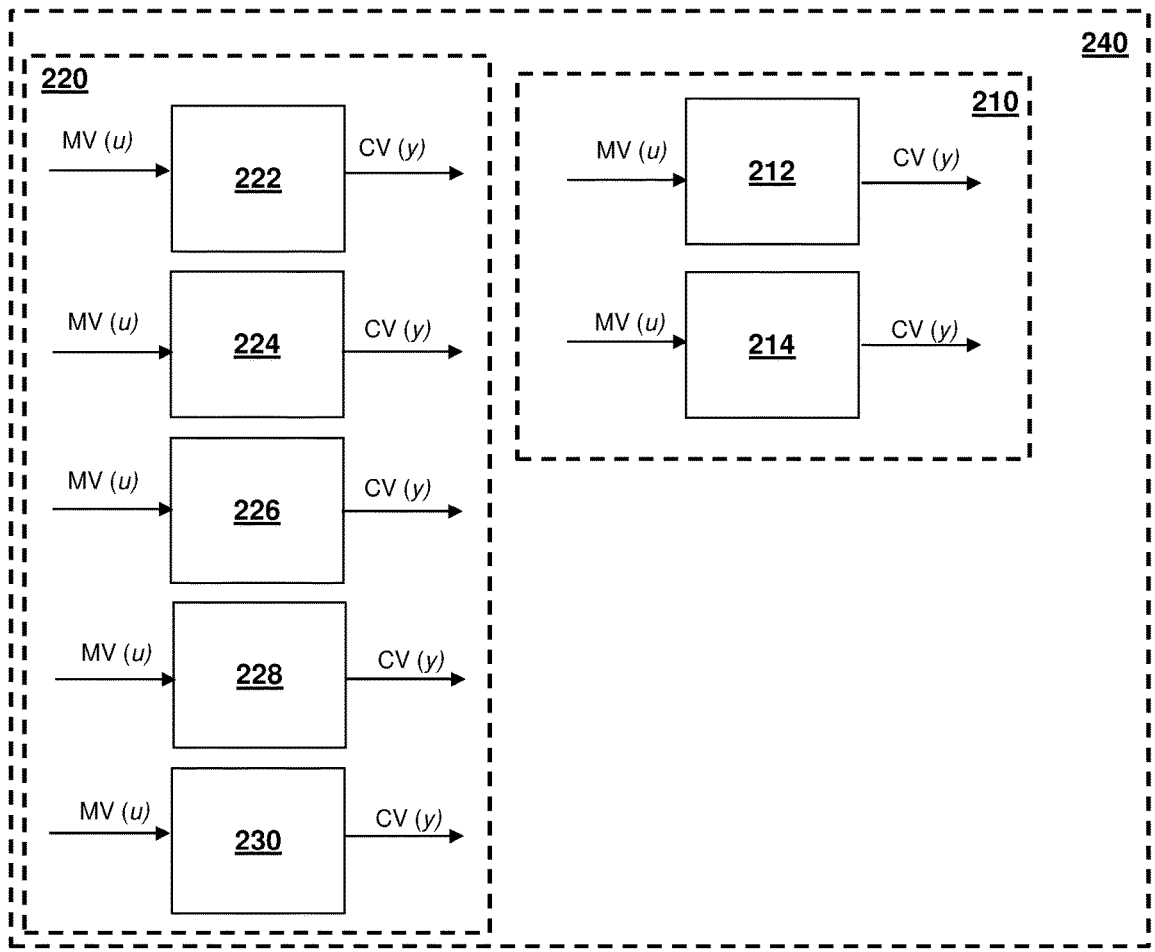
FIG. 3 is a detailed schematic diagram of a model forming part of a master controller according to an embodiment.

FIG. 3 shows an exemplary structure of the model predictive control used by the master controller 140.

As shown, master controller comprises an MPC-based model 240 utilizing an optimization algorithm. Within the model 240 each of the process plants, and the energy storage is modelled to determine input/output relationships. Note that the process plants also include storage (for example, Hydrogen and Nitrogen storage). Factoring storage resources into the overall model is, in embodiments, desirable to achieve optimization of a renewable energy facility as will be described below.

The model 240 comprises two basic groups—a power module 210 and a process module 220. Within each module 210, 220 is one or more models representative of the behaviour of the respective plants/facilities within each module.

For each module 210, 220, each model has one or more manipulated variables (MV) u and one or more control variables (CV) y which define the nature of the model.

The model for each process plant, for each storage unit and/or each power module is, in embodiments, developed based on real-world measurements of the manipulated variables and control variables.

In embodiments, this may be done by running the respective process plant, power system or storage arrangement through a step test. In the step test, one or more manipulated variables are changed and the effect on the control variables measured. As part of the step test, the time to steady state is determined. In other words, for a change to one or more manipulated variables at time t, the time for the relevant control variable(s) to reach a new steady state is determined. This enables creation of a dynamic response model for a given process plant, storage element or power module.

The power module comprises a model 212 representative of the behaviour of the power monitor module 112. The power control systems 110 measure various parameters of the main bus 70 and the manipulated variables (MV) y may include:

Wind power WP
Solar Power SP
Power load L
And the control variables (CV) y may include:
Total available main bus power TP
Maximum power draw MPD Thus the step test may determine the effect on the available power and maximum power draw (as control variables) for a given input power level and type, and for given loads on the power system 70. This allows a dynamic empirical model to be built which is representative of future behaviour of the power systems.

The energy storage model 214 is operable to model the operation of the energy storage resource 76 and controller 114. In embodiments, the energy storage devices may comprise one or more of: Battery Energy Storage System (BESS) 76a or Compressed/Liquid Air Energy Systems (CAES or LAES) 76b.

The energy storage model 214 is operable to derive, through testing, a dynamic response model of the energy storage resource 76. The manipulated variables (MV) u may comprise charging (i.e. power input) and discharging (i.e. power utilization) rates. Control variables may comprise the battery capacity level, i.e. the energy available in the energy storage resource 76.

The process module 220 represents models of the process plants and Hydrogen storage 30 and LIN SVD 42.

The process module 220 comprises a model 222 of the Hydrogen production plant 22. Manipulated variables which may be measured by the master controller 140 and which are used as inputs into the model 222 may include:

Electrolyzer Power Consumed [EP(k)]
Demin Water Flow [ED(k)]
Average cell temperature [ECT(k)],
Average cell pressure [ECP(k)],
Current flowing through the electrodes [I(k)]
where k is the k' electrolyser.

And the control variables y may comprise the Electrolyzer Hydrogen Produced EH(k).

A model 224 of the Hydrogen storage 30 is also provided. The model 224 may utilise manipulated variables (MV) u such as, in embodiment, the Hydrogen storage pressure and/or temperature SP, ST, and pressure and flow of compressed hydrogen gas HCP, HCF to the Ammonia Synthesis plant 50. The model 224 may be a dynamic response model which is operable, using a step test, to model the dynamics of the Hydrogen storage 30. Controlled variables y may comprise as available flow rates, the storage time constant, and pressures in the system A model 226 of the ASU 40 and controller 126 may also be provided which may utilise manipulated variables (MV) u including power requirements, airflow to ASU and operating capacity. Control variables (CV) y may comprise Nitrogen output volume and rate, concentration of impurities in the Nitrogen product gas, and may be monitored as a function of time to determine ramp up/ramp down rates for operation.

A model 228 of the Nitrogen storage 42 and controller 128 may also comprise manipulated variables (MV) u of the Nitrogen storage 42 including, but not limited to: storage volumes, compression, capacity, discharge rates, specific power, $N_2$ recovery, and temperature differences in a heat exchanger forming part of the ASU. Controlled variables (CV) y may then comprise flow rates of downstream Nitrogen and time variations thereof, e.g. ramp up/ramp down rates for operation.

The Ammonia Loop model 230 is operable to model the operational behaviour of the Ammonia loop. Manipulated variables (MV) u for this model 230 may comprise:

Power consumed by Ammonia loop, AP,
Ammonia loop pressure and Temperature, ALP, ALT
Feed flow rates of nitrogen and hydrogen streams, ANF, AHF
Ammonia plant syngas compressor pressure, ACP.

And the control variables (CV) y may include the Ammonia output flow rate/volume.

For each plant and associated model, the master controller 140 is operable to determine and utilize data representing the envelope of the power draw for a given capacity.

Constraints in Process Plant Complex 10

In any process plant, maximum and minimum operating points define the operating range of a process plant. In a process plant complex such as an Ammonia production plant, there is a further interdependency between the various process plants to achieve an optimal Ammonia production rate.

However, in the present invention, because of the large variability in renewable power generation the range of operation between maximum and minimum production in the plant complex 10 is, in general, much larger than the typical production range in an industrial gas facility.

Therefore, in addition to typical process capacity constraints, chemicals production may be constrained by the available renewable power, for example at night for solar generation, or on calm days for wind generation. At these times, efficient operation of the process equipment is critical to maximum utilization of the available renewable power.

Each production process within the plant complex 10 has a maximum and minimum operational capacity. In addition, in a dynamic operation a maximum rate of change of production capacity. These constraints are typically set by mechanical constraints or other physical constraints within the equipment.

Operating at the equipment constraints can be inefficient, for example by causing venting of feedstock or product because of a maximum allowable equipment flow. The difference between the maximum and minimum operating points defines the range of operation and because renewable power sources typically have a much wider range of operation than the chemical production equipment there is a greater opportunity for inefficiencies and lost production.

Thus, in accordance with embodiments of the present invention, the constraints comprise power constraints and process constraints.

Power constraints may apply for each process plant in the plant complex 10, and collectively for the total power draw to run the plant complex 10 in a given condition. Process constraints place constraints on the maximum and minimum capacity for each plant, together with constraints on the rate of change of production capacity (i.e. ramp rates) in response to controller set point changes etc. Physical equipment limitations, quality and/or safety parameters may also apply.

Therefore, in the optimization problem to achieve optimal Ammonia production given a particular power availability, two regimes are defined: low power-limited and high-power limited.

In the low power-limited regime, where production of Ammonia is limited by the available power resources (e.g. during the night or during low wind conditions) then any available resource must be used efficiently. Whilst the electrolysers of the Hydrogen production plant 20 utilize a large proportion of the required power for the plant 10, it is key in this scenario to utilize power effectively between the various process plants to ensure that the optimal amount of Ammonia is produced in these situations.

For example, wastage is to be avoided in these scenarios. If, for example, insufficient Nitrogen is produced during said periods of low power to match the Hydrogen being produced, the Nitrogen availability will comprise the rate-limiting step in Ammonia production. This may lead to oversupply of Hydrogen and, if this Hydrogen cannot effectively be stored (e.g. if there is insufficient capacity), then Hydrogen will need to be vented and will be wasted.

Thus it is key under low power-limited scenarios to ensure that the optimization problem is solved to select capacity set points for each process plant such that optimal Ammonia production may occur given the available power.

Under conditions of sufficient available power from the main bus 70, under conventional conditions a capacity-limited regime dominates, i.e. the maximum Ammonia production rate is dependent upon the maximum Hydrogen and Nitrogen production rates and the maximum available production rate in the Ammonia synthesis plant 50.

However, for power grids based at least in part on renewable sources, transmission limitations in microgrids may dominate. These microgrids may set limitations on the rate at which power can be drawn at any one time without risking an overdraw of the power grid supply. Such an overdraw may lead to shutdown of the electrical supply.

Thus the optimal production rate for Ammonia is constrained both by the plant limitations but also by the power availability constraints. Both of these are utilised by the master controller 140.

Constraints discussed above may apply to both manipulated variables and to control variables within the model 240. For example, constraints on manipulated variables set a range, for each MV u, of $u_{min} < u < u_{max}$ where $u_{min}$ and $u_{max}$ are the minimum and maximum constraints for a given variable.

The same approach applies to control variables CV y where, for each CV y, of $y_{min} < y < y_{max}$ where $y_{min}$ and $y_{max}$ are the minimum and maximum constraints for a given variable.

As noted above, green chemicals production is unique in being potentially constrained by the available renewable power. The power constraints may be in either the generation capacity under specific weather conditions or by transmission limitations in microgrids causing an effective limit on the chemicals production rates by limits within the electrical supply systems. How this is managed will be discussed below.

Time Dependency and Ramp Rates

As noted above, the master controller 140 utilising model predictive control is operable to optimize the manipulated variable set points and processes for the plants forming part of the plant complex 10 within a predetermined time horizon given the determined available power and capacity constraints.

This is achieved, in embodiments, by optimizing over a predetermined time horizon. The time horizon is determined by the component in the system having the slowest response rate to a specific change. In other words, the time period to adjust a controlled variable from level A to level B will determine the prediction horizon. The precise operation of the master controller 140 will be discussed further below.

In detail, the optimization problem is required to consider the dynamic effects of time-variation of capacity. In other words, each process plant has a particular range of capacity ramp rates which must be adhered to.

First, ramp rates between two different operational capacity levels are determined on one level by mechanical, chemical and physical limitations or requirements of the process plants themselves.

For example, in embodiments, the ramp rates for the Hydrogen production plant 20 (e.g. electrolysers and compressors) may be of the order of tens of % per minute. However, ramp rates for the Ammonia production plant 50 may be of the order of tens of % per hour. The ASU ramp rate may be slower than this.

In addition, ramp rates may be limited by other constraints such as safety requirements. For example, the possibility of a vacuum occurring in an electrolyser system if too aggressive a ramp rate is applied is a considerable safety issue.

Further, any increased power requirements, even if temporary, in moving from one operational capacity level to another may place additional limitations on the power network or on particular equipment.

Master Controller 140 Operation

As discussed above, the master controller 140 comprises an optimization algorithm 240 operable to determine the rate at which the various industrial gas plants should run to manage the renewable Hydrogen production and storage optimally while maximizing ammonia production for a given power output. Thus, the master controller 140 enables real-time optimization of an industrial gas plant complex using renewable power.

The process set points for each plant as discussed above are taken as the inputs and applied to the master controller 140 to propose optimal rates at which to run the ammonia plant complex 10 within a fixed prediction horizon using the manipulated and control variables of the model 240.

The rates of the industrial gas plants such as Hydrogen production plant 20, hydrogen compression and storage system 14, the air separation unit 16, Nitrogen storage 16a and the water plant are linked to the Ammonia rate and are controlled by lower-level controllers as described above.

The master controller 140 may be implemented on a computer and receives various inputs from the other controllers in the system. Available power and load comes from the power system controller 110.

The operational conditions of the industrial gas plants are determined by the systems 120 and input into the model 240 which generates set point targets for the manipulated variables.

The optimization generates set points within the predicted time horizon to balance the available power and consumed power so that right amount of Hydrogen is produced and ammonia plant runs at the correct rate to maximize ammonia production.

The output may be a recommended Ammonia production rate that is transferred automatically to advanced control systems controlling the ammonia plant, ASU, electrolyzer, water plant and Hydrogen compression and storage.

In more detail, the real-world and real-time manipulated variables and control variables for each process plant and each power system are measured on a continuous real-time basis. At time sample t, the predicted values of the manipulated variables for a prediction time horizon P are determined based on the measured values of the plant variables at time t.

Within the prediction time horizon, a set of discrete manipulated variable set points are calculated between time t and time t+P. The discrete set of variables are set at a predetermined interval. For example, M set point variables may be determined between time t and time t+P, where M is any suitable integer. The set points may be evenly spaced in time.

Then, when the first set point (i.e. M=1) is reached, the process is repeated for time t+1 for a time period between t+1 and t+1+P and so on. This is known as a receding horizon method.

Method

Figure 4:
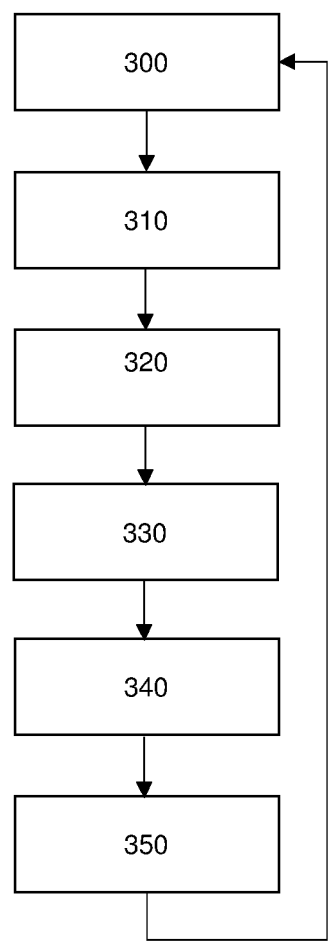
FIG. 4 is a flow chart of a method according to an embodiment.

FIG. 4 shows a method according to an embodiment. In embodiments, there is provided a method of controlling one or more industrial gas powered by one or more renewable power sources. The method is executed by at least one hardware processor.

At step 300, time-dependent power data for a power network including one or more renewable power sources is received. This may be, in embodiments, received on a real-time basis.

At step 310, time-dependent operational characteristic data relating to the manipulated variables and control variables for each industrial gas plant is received.

At step 320, time-dependent operational characteristic data relating to the manipulated variables and control variables for the industrial gas storage, for example, Hydrogen, Nitrogen and/or Ammonia storage as described above in the present embodiments, is received.

The operational characteristic data may be provided in real time by the controllers of each process plant.

At step 330, the predicted power data and predicted characteristic data is utilized in the optimization model 240 of the master controller 140 to generate a set of manipulated variables for the plurality of industrial gas plants, the industrial gas storage units and the power supply units.

At time sample t, the predicted values of the manipulated variables for a prediction time horizon P are determined based on the measured values of the plant variables at time t. Within the prediction time horizon, a set of discrete manipulated variable set points are calculated between time t and time t+P. The discrete set of variables are set at a predetermined interval. For example, M set point variables may be determined between time t and time t+P, where M is any suitable integer. The set points may be evenly spaced in time.

In embodiments, this may be done by solving an optimization problem forming the model 240. The optimization problem is solved factoring in both power resource availability and constraints and process plant capacity and both static (e.g. capacity) and dynamic (e.g. ramp rate) constraints.

At step 340, the measured manipulated variable values are utilized to generate a set of control set points for the plurality of industrial gas plants, the industrial gas storage units and the power supply units. The set points may be defined to achieve any specified goal. The set points may alternatively or additionally be utilized to minimize the objective and, in embodiments, maximize the production of industrial gas given the available power.

At step 350, the control set points are sent to a control system to control the industrial gas plant complex by adjusting one or more control set points of the industrial gas plants.

The method then returns to step 300 for the next time period when the next set point is reached.

In summary, in exemplary embodiments a control and optimization system for a Ammonia producing-industrial gas plant complex is provided. The industrial gas plant complex comprises a plurality of industrial gas plants, including a Hydrogen production plant utilizing electrolysis of water, an air separation plant for production of nitrogen, an ammonia synthesis plant to produce ammonia, a hydrogen storage system and an ammonia production system.

In exemplary embodiments, the system seeks to maximize ammonia production given the current available power and any constraints on the process systems. This is, in embodiments, achieved by attempting to maintain Hydrogen production at a constant maximum rate achievable with the available power.

As noted above, the industrial gas plant complex 10 comprises the Hydrogen production plant 20, the Hydrogen storage unit 30, the Air Separation Unit (ASU) 40, the Ammonia Synthesis plant 50 and the ammonia storage unit 60, some of which are controlled by respective control systems.

In embodiments, the power availability is used to define the operational set points of the different industrial gas plants.

These decisions are operable in embodiments to achieve a high process efficiency. This requires accurate quantitative understanding of the different process units in terms of their real-time performance, system availability information together with resource availability The model execution computer(s) will be connected to other computer database systems where the data from the plant will be stored. As the plant is operating, performance models are used to make predictions from the short term (of the order of 15 minutes) to long term (24 hours) get the production profiles.

Figure 5A:
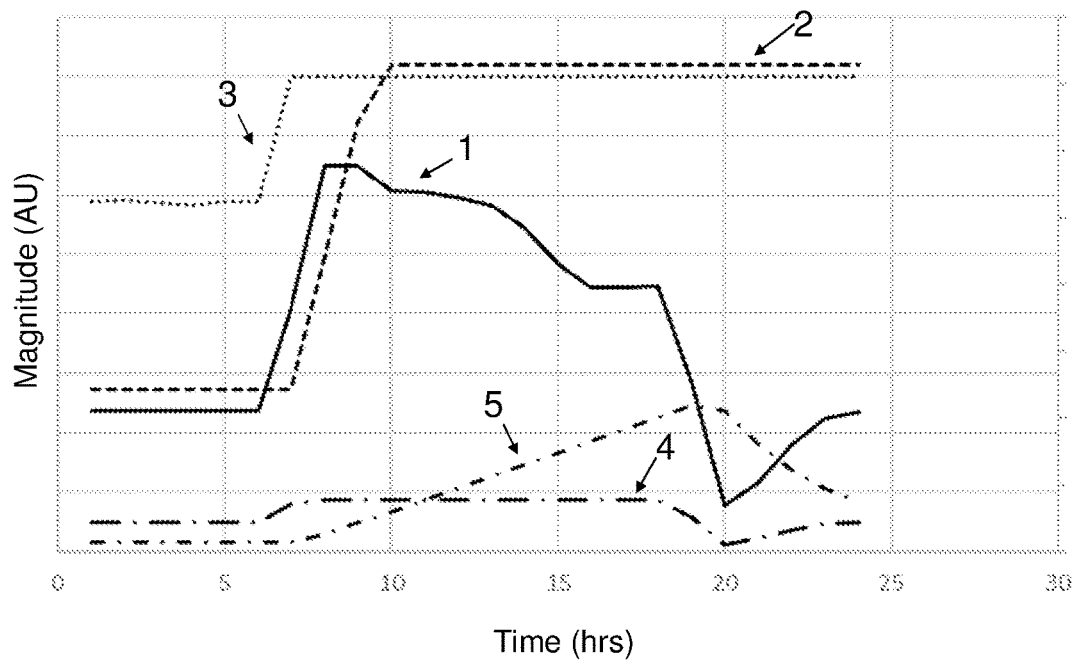
FIG. 5A is a schematic graph showing power generation, battery power and associated production and storage rates for various process parameters for a typical summer day.
Figure 5B:
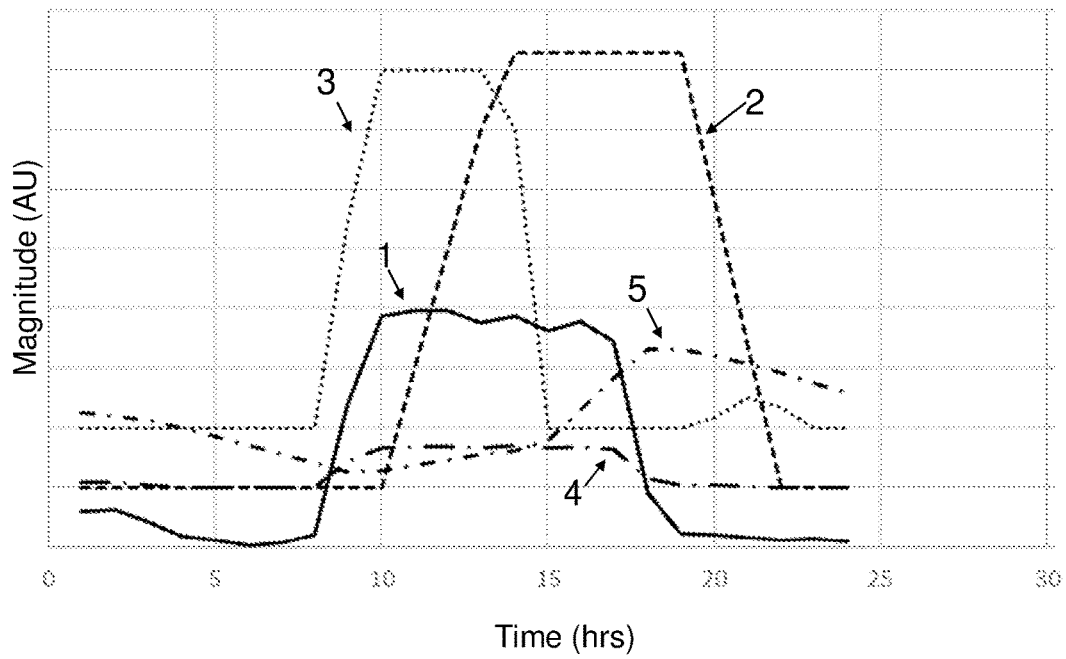
FIG. 5B is a schematic graph showing power generation, battery power and associated production and storage rates for various process parameters for a typical winter day.

FIGS. 5A and 5B show exemplary schematic data for the industrial gas plant complex 10 for representative 24-hour periods. FIG. 5A shows exemplary schematic data for a typical summer's day, and FIG. 5B show exemplary schematic data for a typical winter day.

In each of FIGS. 5A and 5B, five lines are shown. These comprise: Generated power 1 (solid line); Battery energy 2 (dashed line); Ammonia plant production rate 3 (dotted line); Hydrogen production 4 (long dash/dotted line); and Hydrogen stored 5 (short dash/dotted line).

Turning first to FIG. 5A, on a typical summer's day solar power availability is high for a significant proportion of the day. Wind power availability is also high. Therefore, generated power 1 maintains a generally constant baseline and a high peak early in a given day. Given supplied energy is plentiful, the Ammonia production plant can be run such that the Ammonia production rate 3 is moderate and is at a substantially constant high level during the day.

In addition, the battery 76 is only used at night time and so is charged to maximum during the day and only drops to a lower level by morning when used during the night.

Finally, Hydrogen production is run at a rate which generally correlates with the available power. Production of Hydrogen is sufficient to store Hydrogen for use when power availability is low during the night. This peaks at hour 20.

In contrast, FIG. 5B shows the situation for a typical winter day in which sunlight and wind levels are lower. As shown, generated power is at or close to zero during the night and reaches a relatively smaller peak during the middle of the day. Therefore, it is necessary to use the battery 76 and battery energy 2 to supplement the generated power 1 during the latter part of the day.

As a result, it is not possible to run the Ammonia production plant at constant high production rate 3 (as for the summer day) for more than about 3-4 hours during the early part of the day.

As for the summer's day, Hydrogen production 4 is run at a rate which generally correlates with power generation 1. Hydrogen storage 5 increases during the day but at a lower rate than for a summer's day.

The above schematic examples show how the invention enables effective control of an industrial gas plant complex comprising different industrial gas plants to achieve a optimum output given a particular profile of available power. The invention is also operable to control the industrial gas plant complex to optimize a production parameter (such as, for example, Ammonia production rate) in response to available storage resources such as energy storage (e.g. battery energy) and production gas storage (e.g. Hydrogen or Nitrogen).

While the invention has been described with reference to the preferred embodiments depicted in the figures, it will be appreciated that various modifications are possible within the spirit or scope of the invention as defined in the following claims.

For example, whilst the present embodiments have been described in relation to an Ammonia plant complex, the present invention is applicable to any other suitable form of industrial gas plant utilising, at least in part, renewable power. For example, the industrial gas plant or gas complex may be a Hydrogen or methanol production facility. Other alternatives will be apparent to one having ordinary skill in the art.

In the specification and claims, the term "industrial gas plant" is intended to refer to process plants which produce, or are involved in the production of industrial gases, commercial gases, medical gases, inorganic gases, organic gases, fuel gases and green fuel gases either in gaseous, liquified or compressed form.

For example, the term "industrial gas plant" may include process plants for the manufacture of gases such as those described in NACE class 20.11 and which includes, non-exhaustively: elemental gases; liquid or compressed air; refrigerant gases; mixed industrial gases; inert gases such as carbon dioxide; and isolating gases. Further, the term "industrial gas plant" may also include process plants for the manufacture of industrial gases in NACE class 20.15 such as Ammonia, process plants for the extraction and/or manufacture of methane, ethane, butane or propane (NACE classes 06.20 and 19.20), and manufacture of gaseous fuels as defined by NACE class 35.21. The above has been described with respect to the European NACE system but is intended to cover equivalent classes under the North American classifications SIC and NAICS. In addition, the above list is non-limiting and non-exhaustive.

Whilst the above disclosure has focused on model predictive control models, one of ordinary skill would be readily aware of variations which could be used. For example, other model-based controllers may be used with the present invention. Further, non-model based control algorithms may be implemented.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

In the discussion of embodiments of the present invention, the pressures given are absolute pressures unless otherwise stated.

All prior teachings above are hereby incorporated herein by reference. No acknowledgement of any prior published document herein should be taken to be an admission or representation that the teaching thereof was common general knowledge in Australia or elsewhere at the date thereof.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules", "units" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method of controlling an industrial gas production facility comprising one or more industrial gas plants powered by a power network including one or more renewable power sources, the method being executed by at least one hardware processor, the method comprising:

receiving time-dependent power data representative of one or more operational parameters of the power network;

receiving time-dependent operational characteristic data representative of operational parameters of the one or more industrial gas plants, the operational parameters of the one or more industrial gas plants including:

at least one hydrogen production operational characteristic variable, at least one hydrogen storage variable, at least one air separation unit (ASU) variable for nitrogen production and/or nitrogen storage, and at least one ammonia loop predictor variable for ammonia production;

defining one or more power constraints for the operational parameters of the power network;

defining one or more process constraints for the operational parameters of each industrial gas plant;

generating, based on the power data, the operational characteristic data, the one or more power constraints and the one or more process constraints, control set point values for the one or more industrial gas plants to achieve a pre-determined production parameter for the industrial gas production facility, the generating of the control set point values including:

a master controller implementing a pre-defined model predictive control (PMC) to generate control variables based on at least some of the received time-dependent operational characteristic data representative of the operational parameters of the one or more industrial gas plants, the control variables including electrolyzer hydrogen produced and/or ammonia output; and sending the control set point values to a control system to control the one or more industrial gas plants by adjusting one or more control set points of the industrial gas plants to achieve the pre-determined production parameter for the industrial gas production facility.

2. The method according to claim 1, wherein the control variables also include pressure of a hydrogen storage system, nitrogen output volume and/or nitrogen output rate, and wherein the ammonia output is an ammonia output flow rate or an ammonia output volume.

3. The method according to claim 2, wherein:

the at least one hydrogen production operational characteristic variable comprises: electrolyzer power consumed, demineralized water flow, and/or current flowing through electrodes;

the at least one hydrogen storage variable comprises: hydrogen storage pressure and/or hydrogen storage temperature;

the at least one ASU variable for nitrogen production and/or nitrogen storage comprises: air flow to an ASU, nitrogen storage volume, nitrogen discharge rate, and/or nitrogen recovery;

the at least one ammonia loop predictor variable for ammonia production comprises: power consumed by an ammonia loop, ammonia loop pressure, ammonia loop temperature, a nitrogen feed flow rate fed to the ammonia loop, a feed flow rate of hydrogen fed to the ammonia loop, and/or ammonia plant compressor pressure.

4. The method according to claim 3, wherein the master controller uses one or more computational models representative of each of the one or more industrial gas plants and the power network for generation of the control set point values.

5. The method according to claim 4, wherein the step of generating further comprises:

generating a set of manipulated variables for the one or more computational models; and generating, from the set of manipulated variables, the control set point values.

6. The method according to claim 1, wherein the industrial gas production facility further comprises one or more energy storage resources, and wherein the step of receiving time-dependent power data further comprises receiving time-dependent operational characteristic data representative of one or more operational parameters of the energy storage resources.

7. The method according to claim 6, wherein the step of generating further comprises generating control set point values for the one or more energy storage resources.

8. The method according to claim 6, wherein the one or more energy storage resources comprise one or more of: a battery energy storage system; a compressed air energy storage system; and a liquid air energy storage system.

9. The method according to claim 1, wherein the industrial gas production facility further comprises one or more industrial gas storage resources, and wherein the step of receiving time-dependent operational characteristic data further comprises receiving time-dependent operational characteristic data representative of operational parameters of the industrial gas storage resources.

10. The method according to claim 9, wherein the step of generating further comprises generating control set point values for the one or more industrial gas storage resources.

11. A system for controlling an industrial gas production facility comprising one or more industrial gas plants powered by a power network including one or more renewable power sources, the system comprising:

at least one hardware processor operable to perform the steps of:

receiving time-dependent power data representative of one or more operational parameters of the power network;

receiving time-dependent operational characteristic data representative of operational parameters of the one or more industrial gas plants, the operational parameters of the one or more industrial gas plants including:

at least one hydrogen production operational characteristic variable, at least one hydrogen storage variable, at least one air separation unit (ASU) variable for nitrogen production and/or nitrogen storage, and at least one ammonia loop predictor variable for ammonia production;

defining one or more power constraints for the operational parameters of the power network;

defining one or more process constraints for the operational parameters of each industrial gas plant;

generating, based on the power data, the operational characteristic data, the one or more power constraints and the one or more process constraints, control set point values for the one or more industrial gas plants to achieve a pre-determined production parameter for the industrial gas production facility, the generating of the control set point values including:

a master controller implementing a pre-defined model predictive control (PMC) to generate control variables based on at least some of the received time-dependent operational characteristic data representative of the operational parameters of the one or more industrial gas plants, the control variables including electrolyzer hydrogen produced and/or ammonia output; and sending the control set point values to a control system to control the one or more industrial gas plants by adjusting one or more control set points of the industrial gas plants to achieve the pre-determined production parameter for the industrial gas production facility.

12. The system of claim 11, wherein the control variables also include pressure of a hydrogen storage system, nitrogen output volume and/or nitrogen output rate, and wherein the ammonia output is an ammonia output flow rate or an ammonia output volume.

13. The system according to claim 12, wherein:
the at least one hydrogen production operational characteristic variable comprises: electrolyzer power consumed, demineralized water flow, and/or current flowing through electrodes;
the at least one hydrogen storage variable comprises: hydrogen storage pressure and/or hydrogen storage temperature;
the at least one ASU variable for nitrogen production and/or nitrogen storage comprises: air flow to an ASU, nitrogen storage volume, nitrogen discharge rate, and/or nitrogen recovery;
the at least one ammonia loop predictor variable for ammonia production comprises: power consumed by an ammonia loop, ammonia loop pressure, ammonia loop temperature, a nitrogen feed flow rate fed to the ammonia loop, a feed flow rate of hydrogen fed to the ammonia loop, and/or ammonia plant compressor pressure.

14. The system according to claim 13, wherein the master controller is configured to utilize one or more computational models representative of each of the one or more industrial gas plants and the power network for generation of the control set point values.

15. The system according to claim 14, wherein the step of generating further comprises:
generating a set of manipulated variables for the one or more computational models; and
generating, from the set of manipulated variables, the control set point values.

16. The system according to claim 11, wherein the industrial gas production facility further comprises one or more energy storage resources, and wherein the step of receiving time-dependent power data further comprises receiving time-dependent operational characteristic data representative of one or more operational parameters of the energy storage resources.

17. The system according to claim 16, wherein the step of generating further comprises generating control set point values for the one or more energy storage resources.

18. The system according to claim 16, wherein the one or more energy storage resources comprise one or more of: a battery energy storage system; a compressed air energy storage system; and a liquid air energy storage system.

19. The system according to claim 11, wherein the industrial gas production facility further comprises one or more industrial gas storage resources, and wherein the step of receiving time-dependent operational characteristic data further comprises receiving time-dependent operational characteristic data representative of operational parameters of the industrial gas storage resources.

20. A non-transitory computer readable storage medium storing a program of instructions executable by a machine to perform a method of controlling an industrial gas production facility comprising one or more industrial gas plants powered by a power network including one or more renewable power sources, the method being executed by at least one hardware processor, the method comprising:
receiving time-dependent power data representative of operational parameters of the power network;
receiving time-dependent operational characteristic data representative of operational parameters of the one or more industrial gas plants, the operational parameters of the one or more industrial gas plants including:
at least one hydrogen production operational characteristic variable, at least one hydrogen storage variable, at least one air separation unit (ASU) variable for nitrogen production and/or nitrogen storage, and at least one ammonia loop predictor variable for ammonia production;
defining one or more power constraints for the operational parameters of the power network;
defining one or more process constraints for the operational parameters of each industrial gas plant;
generating, based on the power data, the operational characteristic data, the one or more power constraints and the one or more process constraints, control set point values for the one or more industrial gas plants to achieve a pre-determined production parameter for the industrial gas production facility, the generating of the control set point values including:
a master controller implementing a pre-defined model predictive control (PMC) to generate control variables based on at least some of the received time-dependent operational characteristic data representative of the operational parameters of the one or more industrial gas plants, the control variables including electrolyzer hydrogen produced and/or ammonia output; and
sending the control set point values to a control system to control the one or more industrial gas plants by adjusting one or more control set points of the industrial gas plants to achieve the pre-determined production parameter for the industrial gas production facility.

* * * * *